US008003150B2

(12) United States Patent
Degenhardt et al.

(10) Patent No.: US 8,003,150 B2
(45) Date of Patent: Aug. 23, 2011

(54) FLAVONOID SUGAR ADDITION PRODUCTS, METHOD FOR MANUFACTURE AND USE THEREOF

(75) Inventors: Andreas Degenhardt, Grafing (DE); Frank Ullrich, Vaterstetten (DE); Thomas Hofmann, Neufahrn (DE); Timo Stark, Muenster (DE)

(73) Assignee: Kraft Foods R & D, Inc., Northfield, IL (US)

( * ) Notice: Subject to any disclaimer, the term of this patent is extended or adjusted under 35 U.S.C. 154(b) by 1051 days.

(21) Appl. No.: 11/750,121

(22) Filed: May 17, 2007

(65) Prior Publication Data

US 2007/0269570 A1 Nov. 22, 2007

(30) Foreign Application Priority Data

May 19, 2006 (EP) .................................... 06010370

(51) Int. Cl.
*A23L 1/22* (2006.01)
*A23L 1/236* (2006.01)
*A23L 2/56* (2006.01)
(52) U.S. Cl. ........................................ 426/536; 426/548
(58) Field of Classification Search .................. 426/536, 426/548
See application file for complete search history.

(56) References Cited

U.S. PATENT DOCUMENTS

| | | | |
|---|---|---|---|
| 3,753,726 A | 8/1973 | Clinton et al. | |
| 4,183,965 A | 1/1980 | Mookherjee et al. | |
| 4,906,480 A | 3/1990 | Kashket | |
| 5,562,941 A | 10/1996 | Levy | |
| 5,631,038 A | 5/1997 | Kurtz et al. | |
| 5,652,124 A * | 7/1997 | Hijiya et al. .................... | 435/78 |
| 2003/0003212 A1 | 1/2003 | Chien et al. | |
| 2003/0008046 A1 | 1/2003 | Gerlat et al. | |
| 2003/0203857 A1 * | 10/2003 | Ohnogi et al. .................. | 514/27 |
| 2004/0091589 A1 * | 5/2004 | Roy et al. ....................... | 426/265 |
| 2004/0266699 A1 * | 12/2004 | Porta ............................ | 514/27 |

FOREIGN PATENT DOCUMENTS

| | | |
|---|---|---|
| DE | 298 08 384 U1 | 8/1998 |
| EP | 1 106 073 A1 | 6/2001 |
| EP | 1 260 517 A1 | 11/2002 |
| EP | 1 364 584 A2 | 11/2003 |
| JP | 58-162260 | 9/1983 |
| JP | 05-176786 | 7/1993 |
| JP | 07-179489 | 7/1995 |
| JP | 08-217674 | 8/1996 |
| JP | 08-298930 | 11/1996 |
| JP | 10-248501 | 9/1998 |
| JP | 11-318338 | 11/1999 |
| JP | 2001-046096 | 2/2001 |
| JP | 2001-240532 | 9/2001 |
| WO | 96/01568 A1 | 1/1996 |
| WO | 02/100192 A1 | 12/2002 |
| WO | 2004/093571 A1 | 11/2004 |

OTHER PUBLICATIONS

Satoshi Morimoto et al., "Tannins and Related Compounds. XXXVIII. Isolation and Characterization of Flavan-3-ol Glucosides and Procyanidin Oligomers from Cassia Bark (*Cinnamomum cassia* Blume)", Chemical and Pharmaceutical Bulletin, Pharmaceutical Society of Japan, Tokyo, Japan, vol. 34, No. 2, 1986, pp. 633-642.

Biosis Database Abstract for I. D. Chkhikvishvili et al., "Isolation and Composition of Minor Flavonoids from the Georgian USSR Tea Plant", Prikladnaya Biokhimiya i Mikrobiologiya, vol. 22, No. 3, 1986, pp. 410-422, one page.

Yoshiki Kashiwada et al., "Tannins and Related Compounds. XLV. Rhubarb. (5). Isolation and Characterization of Flavan-3-ol and Procyanidin Glucosides", Chemical and Pharmaceutical Bulletin, Pharmaceutical Society of Japan, Tokyo, Japan, vol. 34, No. 8, 1986, pp. 3208-3222.

Tsutomu Hatano et al., "Proanthocyanidin glycosides and related polyphenols from cacao liquor and their antioxidant effects," Phytochemistry, vol. 59, No. 7, Apr. 2002, pp. 749-758.

Ferran Sanchez-Rabaneda et al., "Liquid chromatographic/ electrospray ionization tandem mass spectrometric study of the phenolic composition of cocoa (*Theobroma cacao*)", Journal of Mass Spectrometry, John Wiley & Sons, Chichester, Great Britain, vol. 38, No. 1, Jan. 2003, pp. 35-42.

Zhou Zhi-Hong et al, "Puerins A and B, Two New 8-C Substituted Flavan-3-ols from Pu-er Tea", Journal of Agricultural And Food Chemistry, vol. 53, No. 22, Nov. 2005, pp. 8614-8617.

Timo Stark and Thomas Hofmann, "Application of a Molecular Sensory Science Approach to Alkalized Cocoa (*Theobroma cacao*): Structure Determination and Sensory Activity of Nonenzymatically C-Glycosylated Flavan-3-ols," Journal of Agricultural and Food Chemistry, vol. 54, No. 25, 2006, pp. 9510-9521.

\* cited by examiner

*Primary Examiner* — Humera Sheikh
*Assistant Examiner* — Saeeda Latham
(74) *Attorney, Agent, or Firm* — Fitch, Even, Tabin & Flannery

(57) ABSTRACT

The present invention relates to flavonoid sugar addition products and a method for making the same. It also relates to the use of these addition products for modifying the taste of food products.

8 Claims, No Drawings

FLAVONOID SUGAR ADDITION PRODUCTS, METHOD FOR MANUFACTURE AND USE THEREOF

The present invention relates to flavonoid sugar addition products, a method for their manufacture and their use.

Flavonoids and their polymers constitute a class of food constituents, which alter metabolic processes and have a positive impact on health. Flavonoids have thus attracted considerable interest as food components or food additives.

While flavonoids provide for a variety of health benefits, flavonoid-containing foods often suffer from bitter and astringent taste. This can be compensated by processing the food so that it contains less flavonoids. For instance, methods for the treatment of cocoa to remove or inhibit such bitter and astringent taste properties are disclosed in EP-A 1 106 073. This method attends to the water content and proposes alkalization and roasting. JP-A 11318338 discloses a method based on a pressure and heat treatment together with the use of alkali. While these methods lead to a better-taste in terms of bitterness and astringency, they by and large sacrifice the flavonoids and thus the health benefits associated therewith.

In an alternative approach, one can also mask the bitter and astringent taste by adding a variety of compounds such as sweeteners and/or fat components. Taste modified hard confectionary compositions containing functional ingredients are disclosed in EP-B 1 364 584 (oil/fat modification). Various other bitter/astringent taste modifiers are described in US-A 20030003212 (esters of quinic and cinnamic esters); US-A 20030008046 (neotame); WO02/100192 (chlorogenic acids); JP-A 58162260 (decomposition product of aspartame); JP-A 10248501 (sweetener); U.S. Pat. No. 5,562,941 (thiosulfate); U.S. Pat. No. 3,753,726 (acids); WO04/093571 (plant sterol esters); U.S. Pat. No. 4,183,965 (cyclotetradecen-1-ones); JP-A 08298930 (dextrin, cyclodextrin, starch and cyclomaltodextringlucano-transferase); WO 96/01568A1 (Chinese gutta percha leaves and ginseng). However, not only do these components change the characteristics of the product, they may not be desirable constituents of the product at all.

It is thus noted that the prior art did not provide for a satisfactory solution for overcoming bitter and astringent taste without changing the characteristics of the product or impairing its properties.

The present invention is based on the surprising finding that certain flavonoid sugar addition products can mask bitter and astringent taste notes. Unexpectedly these compounds modify the taste profile of various products towards less-astringent and milder. This sensory impact is even further unexpected and surprising in light of the fact that many flavonoids such as catechin or epicatechin are bitter and astringent, while the compounds of the present invention act in the direct opposite manner and bitter and astringent taste properties are reversed. Thus, the novel compounds are effective taste modifiers for astringent and bitter taste in edible preparations, pharmaceutical preparations and cosmetics with mouth contact (i.e. tooth paste, mouth wash). Both the taste intensity and the taste profile perception is improved by the novel compounds.

The compounds offer opportunities as flavouring preparations or ingredients to achieve a less bitter and/or astringent tasting product. The compounds can be used as such or more advantageously in preparations or extracts from flavonoid-rich food. The extracts are a preferred embodiment of the present invention. While other methods to reduce astringency sacrifice the flavonoids and consequently their antioxidant capacity, the present invention conserves the antioxidant capacity of the ingredient, preparation or food product even though the flavonoids have been converted into a sugar addition product. The sugar addition products of the invention not only impart superior taste properties to the food, pharmaceutical preparation or cosmetic, but even more advantageously also increase the antioxidant capacity of preparations, ingredients and edible food products The present invention also discloses a process for making the addition products.

Sugar derivatives of flavonoids are known from e.g. EP-A 1 260 517; JP-A07179489; JP-A05176786 and JP-A2001046096. All of these references relate to O-glycosides. Known uses for these flavonoid O-glycoside preparations are disclosed in U.S. Pat. No. 4,906,480 (sweetness and flavor enhancer); JP-A 2001240532 (cosmetics); and in JP-A 08217674 (inhibitor of histidine decarboxylase).

Flavonoids are a subclass of polyphenols. They generally consist of two aromatic rings, each containing at least one hydroxyl group. The two rings are connected through a three-carbon "bridge" which forms part of a six-membered heterocyclic ring. The flavonoids are further divided into subclasses based on the connection of an aromatic ring to the heterocyclic ring, as well as the oxidation state and functional groups of the heterocyclic ring. Within each subclass, individual compounds are characterized by specific hydroxylation and conjugation patterns.

Typically, flavonoids in foods have the following general structure showing three rings (A, B and C) and numbering pattern:

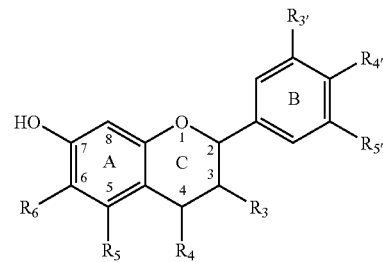

The substituents R3 through R6 may represent hydrogen or a variety of groups such as hydroxyl groups, oxo groups and C1 to C6 linear or branched alkyl groups. For most food flavonoids R4' and, R6 represent a hydrogen atom while R5 represents a hydroxy group. In biochanin A R4' represents a methyl group; in formononetin R4' also represents a methyl group while R5 and R6 represent hydrogen atoms; in glycetein R5 represents a hydrogen atom while R6 represents a hydroxyl group.

The C-ring may also be unsaturated and contain further functional groups. The link between the B and the C ring may be in 2 or 3 position.

The structural diversity of flavonoid aglycones in foods is shown in the Table on page 5. Such compounds are often found in the form of O-glycosylated flavonoids, whereby the structural diversity is increased even further.

Some of the more prominent food flavonoids and their structural characteristics are summarised in the table below:

| Flavonoid subclass | B/C ring connection | C-ring unsaturation | C-ring functional groups | Prominent food flavonoids | Typical source |
|---|---|---|---|---|---|
| Flavanol | 2 | — | 3-OH | (+)-Catechin | teas, red grapes |
| | | | | (+)-Gallocatechin | and red wines |
| | | | | (−)-Epicatechin | |
| | | | | (−)-Epigallocatechin | |
| | | | 3-O-gallate | (−)-Epicatechin-3-gallate | |
| | | | | (−)-Epigallocatechin-gallate | |
| | | | | Proanthocyanidins, such as | |
| | | | | Procyanidin B1, B2, B5 and C1 | |
| Flavanones | 2 | — | 4-oxo | Eriodictoyl | citrus fruits |
| | | | | Hesperitin | |
| | | | | Naringenin | |
| Flavones | 2 | 2-3 double bond | 4-oxo | Apigenin | green leafy |
| | | | | Luteolin | spices (e.g. parsley) |
| Isoflavones | 3 | 2-3 double bond | 4-oxo | Daidzein | soybeans, soy |
| | | | | Genistein | foods and legumes |
| | | | | Glycitein | |
| | | | | Biochanin A | |
| | | | | Formononentin | |
| Flavonols | | | | Isorhamnetin | nearly ubiquitous |
| | | | | Kaempferol | |
| | | | | Myricetin | |
| | | | | Quercetin | |
| Anthocyanidines | | | | Cyanidin | red, purple and |
| | | | | Delphinidin | blue berries |
| | | | | Malvidin | |
| | | | | Pelargonidin | |
| | | | | Petunidin | |
| | | | | Peonidin | |

All flavonoids are suitable for forming the addition products of the present invention at carbon atoms which do not bear a functional group. Conjugation of the sugar to the flavonoid in order to form the sugar addition product is also possible at the C-ring of the flavonoid which is a site of the molecule with high reactivity. Particularly preferred are flavonoids with a hydroxyl group in 5 position such as catechin and epicatechin.

The flavonoid addition products according to the present invention can be obtained from pure flavonoid starting materials or a variety of flavonoid-containing materials such as plant parts, plant extracts and the like. For instance, one may use cocoa nibs as well as extracts from cocoa which contain higher levels of flavonoids (e.g. Cocoa extract from Naturex, France, #148200, standardized to 40% polyphenols). Other preferred sources for flavonoid starting materials are green tea extracts with high levels of catechins (e.g. green tea extract from Naturex, France, standardized to 95% polyphenols, 756 catechins, <0.5% caffeine, >40% epigallocatechin-gallate); grape seed or skin extracts (e.g. exGrape grape seed polyphenol powder OPC 40 #848F/848G supplied by Breko, Germany with 40% of oligomeric proanthocyanidins; grape polyphenol powder P80, white, #834F; supplied by Breko, Germany with 80% polyphenols).

Preferred compounds according to the present invention are obtained by adding a sugar in 6 and/or 8 position to the A-ring of the above basic structure.

A suitable sugar in the sense of the present invention is a reducing sugar. A reducing sugar is a sugar with a ketone or an aldehyde group. Reducing sugars include fructose, glucose, galactose, glyceraldehydes, lactose, arabinose and maltose. All monosaccharides which contain ketone groups are known as ketoses, and those which contain aldehyde groups are known as aldoses. All ketoses and aldoses are useful within the concept of the present invention. This is also true for non-reducing sugars such as sucrose, as long as they may be converted-into reducing sugars by known means.

In addition, suitable reducing sugars for the present invention may be produced from oligo- or polysaccharides by enzymatic treatment or hydrolysis.

The most preferred sugars according to the present invention are glucose and galactose.

While not wishing to be bound by theory, it is assumed that the below-exemplified reaction between catechin or epicatechin and glucose is representative for the reaction between other flavonoids and reducing sugars as proposed by the present invention:

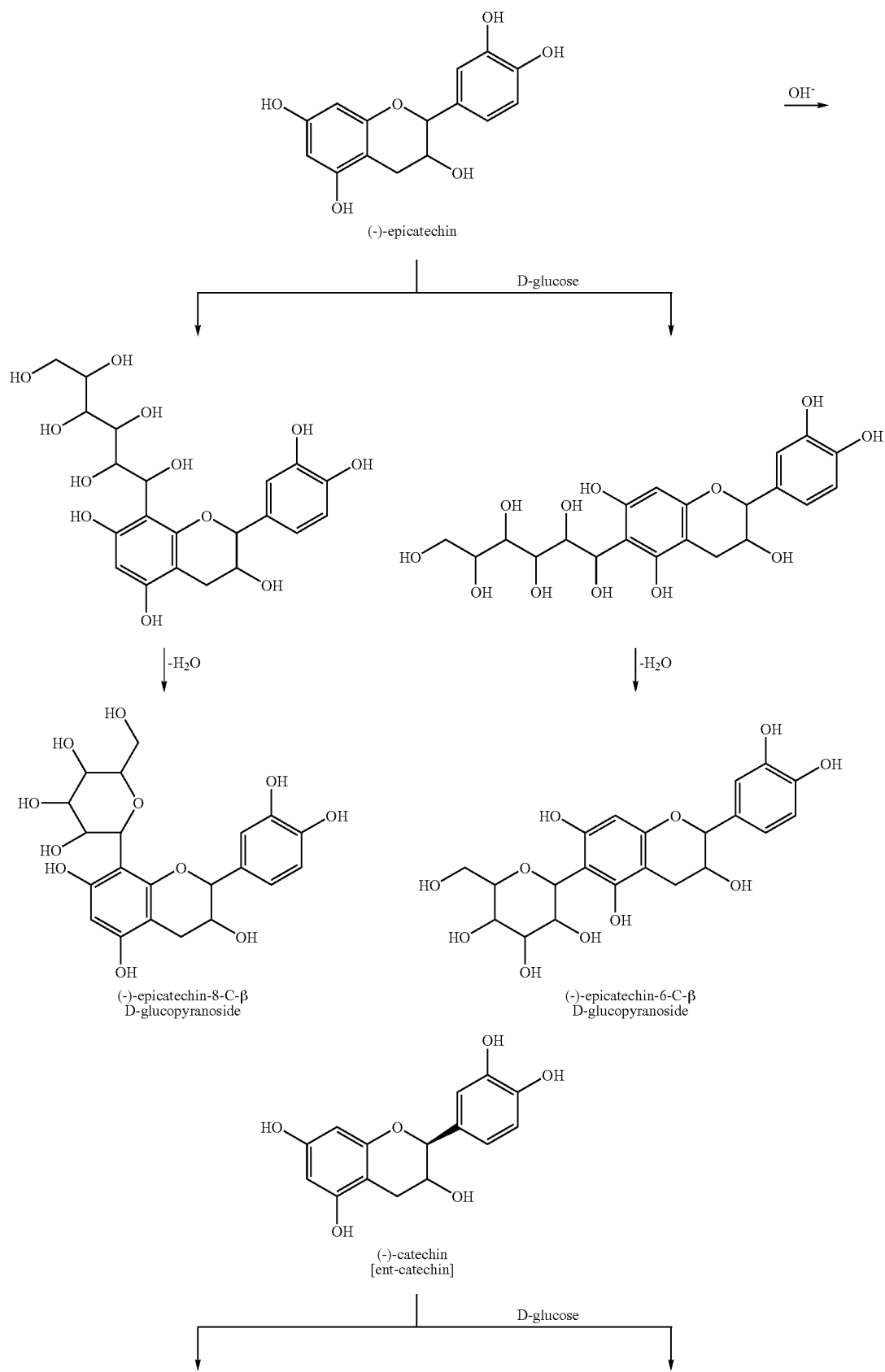

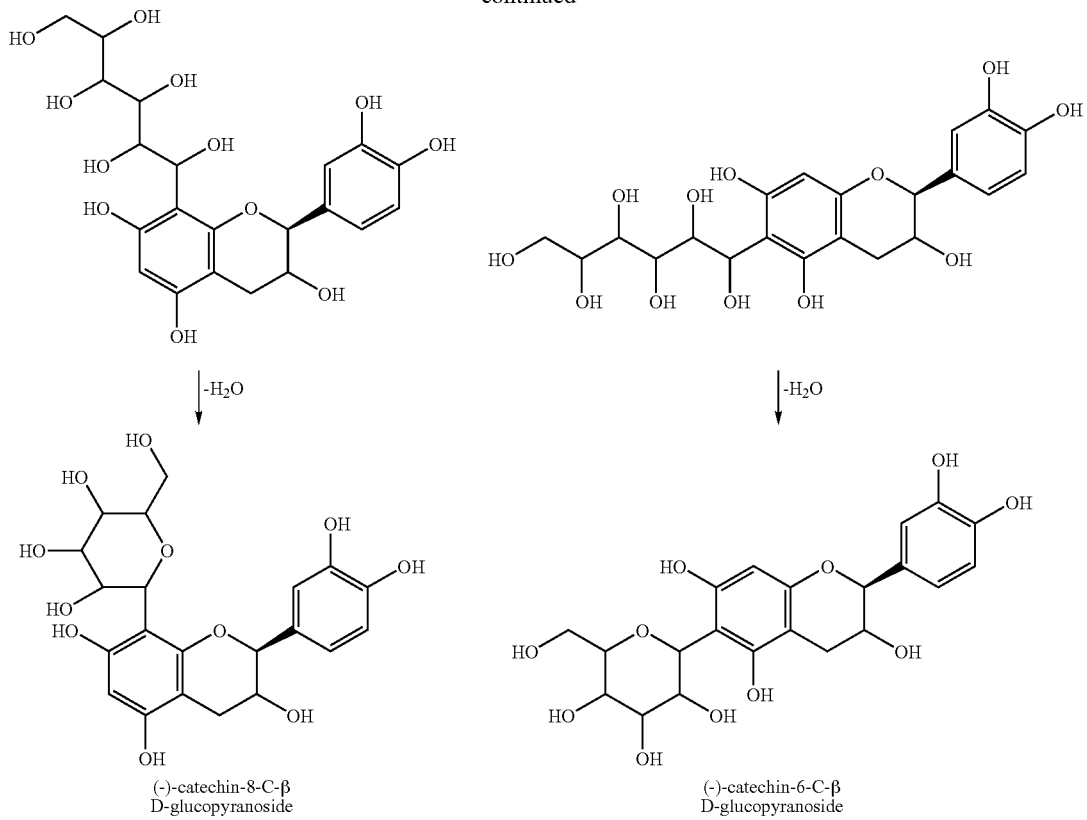

(-)-catechin-8-C-β
D-glucopyranoside (-)-catechin-6-C-β
D-glucopyranoside

Flavonoid addition products according to the present invention wherein the reducing sugar is added in 6 and/or 8 position are most preferred. This is particularly true for the addition products of catechin or epicatechin and glucose and/or galactose. The most preferred compounds according to the present invention are (−)-catechin-6-C-β-D-glucopyranoside, (−)-catechin-8-C-β-D-glucopyranoside, (−)-catechin-6-C-8-C-β-D-diglucopyranoside, (−)-epicatechin-6-C-β-D-glucopyranoside, (−)-epicatechin-8-C-β-D-glucopyranoside, and (−)-epicatechin-G-C-8-C-β-D-diglucopyranoside.

The compounds according to the present invention can be prepared by reacting the flavonoid starting material with the reducing sugar. The reaction proceeds favourably with an excess of sugar. For instance, if cocoa nibs are used as the starting material one may use as much as 1 to 100 g sugar per 200 g cocoa nibs.

Processing under conditions, of pH 6 to 14, preferably pH 8 to 12, and especially at pH≧10 is preferred.

The reaction is preferably conducted in an aqueous mixture, however other solvents such as alcohols or solvent mixtures are also suitable as long as they do not interfere with the addition reaction.

It is advantageous to heat the reaction mixture. Preferred reaction temperatures are in the range of 20 to 120 C, preferably 60 to 100 C and especially 70 to 90 C. Very good results have been obtained at around 80 C, i.e. at 75 to 85 C.

The reaction time is not particularly limited. It is generally governed by the progress of the reaction and adapted accordingly. Generally speaking, however, reaction times are in the order of a few hours, e.g. up to 2 hours, and preferably less than one hour.

The sugar addition products may be used as such, after further processing such as drying, in liquid preparations, immobilized on carriers, etc. or may be extracted with a suitable solvents selected from alcohol, acetone, ethyl acetate and. the like. The sugar addition products may be further enriched by selective liquid-liquid partitioning and/or solid phase extraction/chromatography with suitable solid supports such as polymeric resins, reversed-phase silica gel, ion exchange resins and the like.

The sugar addition products of the present invention are useful to lower astringency and bitterness in large variety of products. This includes cocoa and related products, coffee and coffee-based products, tea beverages and tea extracts. Especially the latter are used for their health benefits. Here the products of the present invention allow for a fortification of these health benefits as they allow for higher quantities and increase palatability of high-flavonoid products. Moreover, the adoption products of the present invention themselves contribute to the benefits of such products as they maintain the high antioxidative potential of the underlying flavonoid. This in fact is true for a wide variety of products including grape extracts.

The compounds of the present invention also allow to lower the astringency in red wines, and provide for a more mellow taste by softening tannin-notes.

The compounds of the present invention may also reduce the pungency of capsaicins, gingerols, etc. which are present in spicy foods with green and red pepper, ginger, etc.

The present compounds also reduce the "sharp, burning" taste sensation of alcohol containing beverages.

The compounds of the present invention are also useful taste modifiers in pharmaceutical compositions and cosmetic preparations for use in the oral cavity.

EXAMPLE 1

The novel compounds can be prepared from (epi-)catechin (2 mmol) with a reducing sugar such as glucose or galactose (20 mmol) with 1440 mg of $K_2CO_3$ added to 25 ml solution (in water, the pH is approx. 10) and reacted at 80° C. for 2.0 min.

The resulting reaction flavor is finally freeze-dried. The individual compounds may be extracted from the reaction flavor by solvent extraction with aqueous acetone or methanol and then isolated by chromatography on RP-18 material using water-methanol gradients. Finally, the compounds were evaporated in vacuo, and the remaining solvent carefully removed by double freeze-drying.

EXAMPLE 2

Sensory tasting (5 persons) showed that alkalized cocoa powder (5 g/200 ml) +50 ppm of 8-C-glycosylated catechin was perceived as less bitter and less astringent than a reference without addition.

Non-alkalized cocoa powder (5 g/200 ml) +50 ppm of 8-C-glycosylated catechin was perceived as milder and less astringent than a reference without addition.

EXAMPLE 3

Grape seed extract (2000 ppm)+ca. 10 ppm 8-C-glucosylated catechin was tasted against reference of grape seed extract (2000 ppm) and tasters found a decrease in astringency.

EXAMPLE 4

Theobromine (600 ppm)+ca. 10 ppm 8-C-glucosylated catechin. The tasters did not a perceive a decrease in bitterness intensity but noted a delay in bitterness perception compared to pure theobromine.

EXAMPLE 5

77 mg of a solution of catechin-8-C-glucoside dissolved in propylene glycol (7.8%) was added to 20 g of molten dark chocolate with strong astringent taste characteristics. After solidification, the chocolate was tasted against a non-treated reference chocolate. It was perceived that the astringency was lower while bitterness remained unchanged. 4 of 5 tasters noticed a "smoothing out" effect, meaning the bitterness and astringency is not masked but is not perceived so much as an upfront hit and does not linger as much as from the blank.

EXAMPLE 6

8 persons tasted alkalized cocoa powder at 5 g/200 ml against alkalized cocoa powder (5 g/200 ml)+50 ppm Cat-6-C-Glc (ppm refer to 1 kg of water). It was found that there was a lower maximum bitterness intensity than in the control sample, a flat bitterness profile and a "softer bitterness quality

EXAMPLE 7

The modified product of example 6 was further compared to alkalized cocoa powder (5 g/200 ml)+50 ppm Epicat-6-C-Glc (ppm refer to 1 kg of water). The sensory evaluation revealed a lower maximum bitterness intensity than control, a flatter bitterness profile and a "softer" bitterness quality.

EXAMPLE 8

The modified product of example 6 was further compared to alkalized cocoa powder (5 g/200 ml)+50 ppm Cat-6,8-C-di-Glc (ppm refer to 1 kg of water). The sensory evaluation revealed a lower maximum bitterness intensity than control, a flatter bitterness profile and a "softer" bitterness quality.

EXAMPLE 9

The examples were repeated with the catechin and epicatechin galactosides and the same sensory results were obtained. As a result, galactose as a reducing sugar to produce the sugar addition products is equally effective as glucose.

EXAMPLE 10

Food ingredients were prepared starting from green tea extract (5 g) or grape seed extract (5 g) by reaction with glucose (4 g) and 3% $K_2CO_3$ in 100 ml of water. The reaction was done at 80° C. for exactly 20 min. The resulting flavour reaction mix was freeze-dried to obtain a dark red-brown mass which was then added to astringent tasting chocolate at various levels. In a first screening sensory tasting, the optimum level of addition was identified as 300 ppm. The resulting chocolate showed a cleaner taste with reduced astringency compared to a non-treated reference sample.

Ingredients prepared from grape seed extract and tea extract in such a manner when added to dark chocolate at 330 ppm decreased the perceived sensory perception of astringency in the dark chocolate.

EXAMPLE 11

The following experiments were conducted to demonstrate the utility of various starting materials. The table indicates the concentration [mg/kg]$^a$ based on a dry weight basis in cocoa nibs:

| compound | raw | roasted | roasted + alkalized |
| --- | --- | --- | --- |
| (+)-catechin | 129.89 | 254.30 | 234.63 |
| (−)-epicatechin | 1382.41 | 1207.48 | 395.03 |
| epicatechin-(4β→8)-epicatechin (procyanidin B2) | 480.70 | 440.11 | 199.94 |
| epicatechin-(4β→8)$_2$-epicatechin (procyanidin C1) | 575.77 | 386.05 | 138.61 |

$^a$Concentrations are given as the mean of duplicates.
$^b$t.a. trace amounts.
$^c$n.d. not detected.

The table below indicates the concentrations ([mg/kg]$^a$ dry weight) of sugar addition products (C-glycosides) obtained when applying different alkalization processes to cocoa nibs (glc indicates glucose; gal indicates galactose):

| | sample name[c] | | | | |
|---|---|---|---|---|---|
| | c-8-C-glc | c-6, 8-C-diglc | c-6-C-glc | c-8-C-gal | c-6-C-gal |
| raw | 0.81 | t.a.[b] | 1.1 | 0.74 | 0.21 |
| roasted | 2.2 | t.a.[b] | 2.5 | 2.0 | 1.8 |
| modified cocoa nibs | 41.9 | 23.1 | 30.2 | 3.7 | 2.7 |

[a] Concentrations are given as the mean of duplicates.
[b] t.a. trace amounts.
[c] In all samples c-6, 8-C-gal was detected in trace amounts.
[d] n.d. not detected.

The modification of the cocoa nibs in order to achieve higher quantities of sugar addition products was done as follows:

time 50 min, T=80° C., m=10 g glucose, 4.4% $K_2CO_3$ (200 g of cocoa nibs).

If other sources of flavonoids other cocoa nibs are used, reaction parameters need to be adjusted to achieve maximum conversion rates to the sugar addition products.

EXAMPLE 12

To investigate the influence of taste modification of (−)-catechin-8-C-β-D-glucopyranoside on theobromine in comparison to the aglycons (+)-catechin and (−)-epicatechin as well as further C-glycosides like apigenin-8-C-β-D-glucopyranoside (vitexin) and apigenin-6-C-β-D-glucopyranoside (isovitexin), theobromine (3 mmol/L) was spiked with different concentrations of (−)-catechin-8-C-β-D-glucopyranoside, (+)-catechin, (−)-epicatechin as well as apigenin-8-C-β-D-glucopyranoside (vitexin) and apigenin-6-C-β-D-glucopyranoside (isovitexin). The results are summarized in the table below:

| Compound added to (3 mmol/L) theobromine | % of panellists who detected a difference[a] | taste/intensity( )[b] |
|---|---|---|
| — | — | bitterness (5.0) |
| 2.2 μmol/L (−)-catechin-8-C-β-D-glucopyranoside | 10 | softer, more pleasant, less bitter (4.5) |
| 22.2 μmol/L (−)-catechin-8-C-β-D-glucopyranoside | 50 | softer, more pleasant less bitter (3.5) |
| 222/L μmol/L (−)-catechin-8-C-β-D-glucopyranoside | 100 | softer, more pleasant less bitter (1.0) |
| 2.2 μmol/L (+)-catechin | 0 | bitterness (5.0) |
| 22.2 μmol/L (+)-catechin | 50 | more cocoa like bitterness (5.0) |
| 222/L μmol/L (+)-catechin | 50 | more cocoa like bitterness (4.0) |
| 2.2 μmol/L (−)-epicatechin | 0 | bitterness (5.0) |
| 22.2 μmol/L (−)-epicatechin | 50 | more cocoa like bitterness (5.0) |
| 222/L μmol/L (−)-epicatechin | 50 | more cocoa like bitterness (4.0) |
| 2 μmol/L vitexin | 0 | bitterness (5.0) |
| 22.2 μmol/L vitexin | 0 | bitterness (5.0) |
| 222/L μmol/L vitexin | 50 | bitterness (4.5) |
| 2.2 μmol/L isovitexin | 0 | bitterness (5.0) |
| 22.2 μmol/L isovitexin | 0 | bitterness (5.0) |
| 222/L μmol/L isovitexin | 50 | bitterness (4.5) |

[a] Eight panelists were asked to compare a solution of theobromine (3 mmol/L) with the a solution of theobromine (3 mmol/L) spiked with different amounts (−)-catechin-8-C-β-D-glucopyranoside, (+)-catechin, (−)-epicatechin, vitexin, and isovitexin by means of a triangel test.
[b] If the sample was detected correctly (c.f. [a]), the changes in taste and taste intensities should be evaluated in comparison to the reference solution of theobromine, which was evaluated with a bitterness of 5.0.

The invention claimed is:

1. A flavonoid sugar-addition product, comprising (−)-catechin-6-C-β3-D-glucopyranoside, (−)-catechin-8-C-β3-D-glucopyranoside, (−)-catechin-6-C-8-C-β3-D-diglucopyranoside or (−)-epicatechin-6-C-8-C-β3-D-diglucopyranoside or the same aglycons with galactoside residues or with another reducing sugar.

2. A composition comprising an addition product according to claim 1.

3. The composition of claim 2, wherein the composition is selected from the group consisting of food products, pharmaceutical preparations and cosmetics and the addition product is present in an amount effective for reducing bitter and/or astringent taste in the composition.

4. The composition according to claim 2 which is an edible product.

5. The composition according to claim 4 which is a modified plant extract.

6. The composition according to claim 4 wherein the composition further comprises cocoa or a cocoa-based product.

7. The composition according to claim 4 wherein the composition further comprises coffee or a coffee-based product.

8. A process for manufacturing the addition product according to claim 1, comprising the step of reacting a flavonoid-containing starting material with a sugar at a pH of 8 to 12, wherein the starting material is catechin or epicatechin and wherein the sugar is a glucose or galactose or another reducing sugar.

* * * * *

UNITED STATES PATENT AND TRADEMARK OFFICE
CERTIFICATE OF CORRECTION

PATENT NO. : 8,003,150 B2  Page 1 of 1
APPLICATION NO. : 11/750121
DATED : August 23, 2011
INVENTOR(S) : Degenhardt et al.

It is certified that error appears in the above-identified patent and that said Letters Patent is hereby corrected as shown below:

IN THE CLAIMS:

Column 12, line 27, in claim 1, delete "β3" and insert -- β --, therefore;
Column 12, line 27, in claim 1, delete "β3" and insert -- β --, therefore;
Column 12, line 28, in claim 1, delete "β3" and insert -- β --, therefore;
Column 12, line 29, in claim 1, delete "β3" and insert -- β --, therefore;

Signed and Sealed this
Twentieth Day of March, 2012

David J. Kappos
*Director of the United States Patent and Trademark Office*